United States Patent [19]

Tech

[11] 3,761,897

[45] Sept. 25, 1973

[54] GAS CELL MEMORY SYSTEM WITH ELECTRICAL READOUT

[75] Inventor: Donald D. Tech, South Chelmsford, Mass.

[73] Assignee: International Business Machines Corporation, Armonk, N.Y.

[22] Filed: June 23, 1972

[21] Appl. No.: 268,218

Related U.S. Application Data

[63] Continuation of Ser. No. 837,573, June 30, 1969, abandoned.

[52] U.S. Cl..... 340/173 PL, 313/201, 315/169 TV, 340/324 R

[51] Int. Cl.... G11c 7/00, G11c 11/28, H05b 41/00

[58] Field of Search .................... 340/173 R, 324 R, 340/173 PL; 328/125, 126; 315/84.5, 84.6, 169 TV; 313/201

[56] References Cited

UNITED STATES PATENTS

| | | | |
|---|---|---|---|
| 3,499,167 | 3/1970 | Baker | 340/173 PL |
| 3,513,327 | 5/1970 | Johnson | 340/173 PL |
| 3,559,190 | 1/1971 | Bitzer | 340/173 PL |

*Primary Examiner*—Bernard Konick
*Assistant Examiner*—Stuart Hecker
*Attorney*—Edwin M. Thomas et al.

[57] ABSTRACT

A gas cell memory includes a gas panel with X and Y coordinate lines disposed on opposite sides of the gas panel to form an array of gas cells at the coordinate intersection. Information selectively may be written, sustained, read or erased in vertically disposed registers. Information is read from the registers electronically, instead of optically, (1) by applying a sinusoidal signal and a pulse signal to provide a composite signal, equal to or greater than the sustain level, to a selected Y line and (2) sensing all of the X lines for the presence of a signal. A signal coupled from the Y line through a gas cell in the binary one state to the associated X line indicates a binary one, and the absence of such a signal indicates a binary zero.

17 Claims, 13 Drawing Figures

INVENTOR
DONALD D. TECH

BY THOMAS & THOMAS
ATTORNEYS

GAS CELL MEMORY SYSTEM WITH ELECTRICAL READOUT

This is a continuation of application Ser. No. 837,573 filed June 30, 1969 now abandoned.

CROSS REFERENCE TO RELATED APPLICATIONS

Application Ser. No. 785,210 filed Dec. 19, 1968, now U.S. Pat. No. 3,611,019 for Display System by George M. Krembs. Application Ser. No. 268,219 filed June 23, 1972 for "Method and Apparatus for Gas Display Panel" by Tony N. Criscimagna et al.

BACKGROUND OF THE INVENTION

1. This invention relates to memory devices and more particularly to memory devices which employ gas cells.

2. Earlier types of memory devices which employed gas cells as storage elements were somewhat slow in operation, complex in construction and hence expensive, as well as somewhat unreliable because the gas cells were read or interrogated by optical devices which determined the stored binary information by the illuminated or dark state of the gas cell. Optical sensors for such reading purposes involve a certain complexity in construction, and each optical sensor must be optically shielded from adjacent gas cell. Since each optical sensor and its shielding equipment is a relatively large unit from a physical standpoint, this limits the number of binary bits which may be stored in each square inch of the gas cell storage device. The result, therefore, is a larger and more complex memory array of gas cells per unit area. It is desirable, on the otherhand, that a gas cell memory include high bit density in the gas cell storage array; it further is desirable to provide high speed sensing for extracting information rapidly upon demand; and yet such memory system preferably should be provided with a decreased cost per bit along with a greater speed of operation and increased reliability. Such is the objective of this invention.

SUMMARY OF THE INVENTION

It is a feature of this invention to provide an improved method for operating a gas cell memory device.

It is a feature of this invention to provide an improved gas cell memory device.

It is a further feature according to this invention to provide an improved method and simplified apparatus for reading information electronically at high speed from a gas cell storage device.

In one arrangement according to this invention a gas panel comprises a container filled with a gas which may be illuminated by an ignition or firing potential applied thereacross. A plurality of X coordinate lines are disposed on one side of the gas panel, and a plurality of Y coordinate lines are disposed on the opposite side of the gas panel with the Y coordinate lines extending orthogonally to the X coordinate lines. The cross-over regions of the X and Y coordinate lines define coordinate intersections, and the gas between the coordinate lines at such coordinate intersections constitute gas cells which may be ignited by electrical firing potentials supplied by the X and Y coordinate lines. The various gas cells are selectively ignited or selectively not ignited to represent binary information. A sinusoidal signal source is continuously supplied to all Y coordinate lines, and it has a first amplitude which equals or exceeds the sustain level of the gas cells. The first amplitude is supplied at all times except when a reading operation takes place. During a reading operation the sinusoidal signal is reduced to a second amplitude which is less than the sustain level of the gas cells. The first amplitude is arbitrarily designated the full amplitude of the sinusoidal sustain signal, and the second amplitude is arbitrarily designated the reduced sinusoidal sustain signal. When the second amplitude, or reduced sustain, is applied to the Y coordinate lines during a read operation, a pulse is supplied to a selected Y line, and the resultant total potential applied to the selected Y line exceeds the sustain potential of the gas cells which thereby ignites all cells which hold a binary one. All cells holding a binary one cause a signal transfer to take place from the selected Y line to the associated X lines of such gas cells. The X lines are sensed for the presence or absence of a signal. The presence of a signal indicates a cell memory one, and the absence of a signal indicates a binary zero. Information is inserted or written in the gas cellmemory device by (1) supplying a sinusoidal signal of full amplitude to all of the Y coordinate lines, (2) supplying a pulse to a selected Y line, and (3) supplying pulses on selected X lines where binary ones are to be stored. Such combined signals establish a potential difference, in excess of the firing potential, across those cells where a binary one is to be stored. Information is erased by (1) applying a sinusoidal signal of full amplitude to all Y coordinate lines, (2) applying a pulse to a selected Y line, and (3) supplying pulses to all X coordinate lines. The net potential difference, applied briefly across each cell of the selected Y line, is so low that each cell is returned to the binary zero state, and such cells are not ignited thereafter when a sinusoidal sustain signal of full amplitude is applied. Stored information is periodically regenerated by applying the sinusoidal sustain signal of full amplitude which causes all gas cells in the binary one state to be periodically ignited; whereas, all cells in the binary zero state are not ignited by such full amplitude sustain signal.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 2 should be placed to the left of FIG. 1.

FIG. 3 should be placed to the left of FIG. 4.

FIG. 5 should be placed to the left of FIG. 6.

DESCRIPTION OF THE PREFERRED EMBODIMENT

Figure 1:
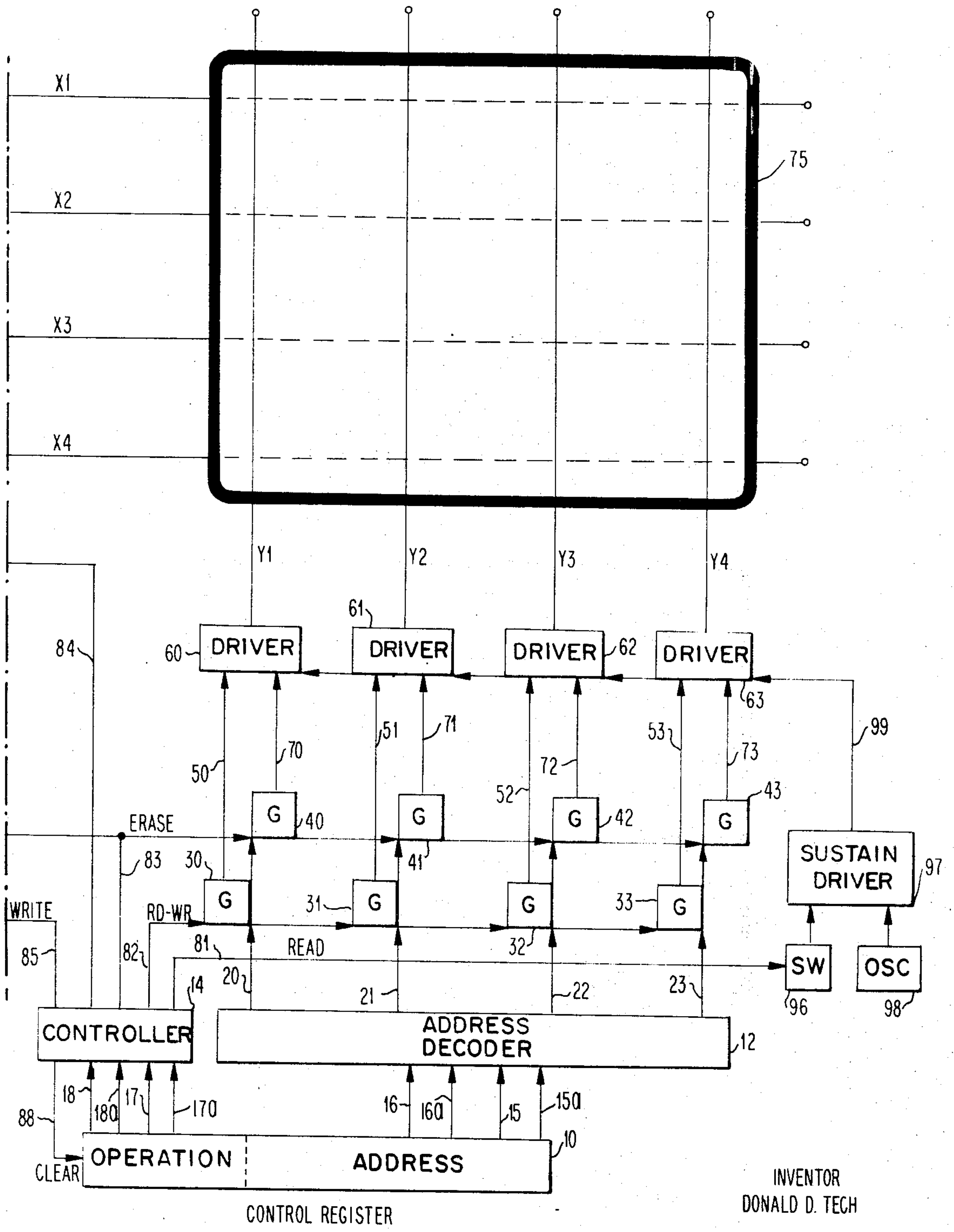
FIGS. 1 and 2 illustrate a memory system according to this invention.

Reference is made to FIG. 1 for a description of a memory system according to this invention. A control register 10 stores address signals and operation signals. The address signals on lines 15, 15*a*, 16 and 16*a* are supplied to an address decoder 12, and the control signals on lines 17, 17*a*, 18 and 18*a* are supplied to a controller 14. The address decoder 12 supplies selection signals on lines 20 through 23 to a first set of gates 30 through 33 and a second set of gates 40 through 43. The output signals from the set of gates 30 through 33 are supplied along respective conductors 50 through 53 to corresponding drivers 60 through 63, and output signals from the set of gates 40 through 43 are supplied on corresponding lines 70 through 73 to the respective drivers 60 through 63. Output signals from the drivers 60 through 63 are supplied on respective lines Y1 through Y4 which are disposed on top of a gas display panel 75. The gas display panel 75 may be anyone of many suitable types of gas display panels, and one suitable such gas display panel is illustrated and described in co-pending application Ser. No. 785,210 filed Dec. 19, 1968 by George M. Krembs for Gas Panel Apparatus And Method.

Figure 2:
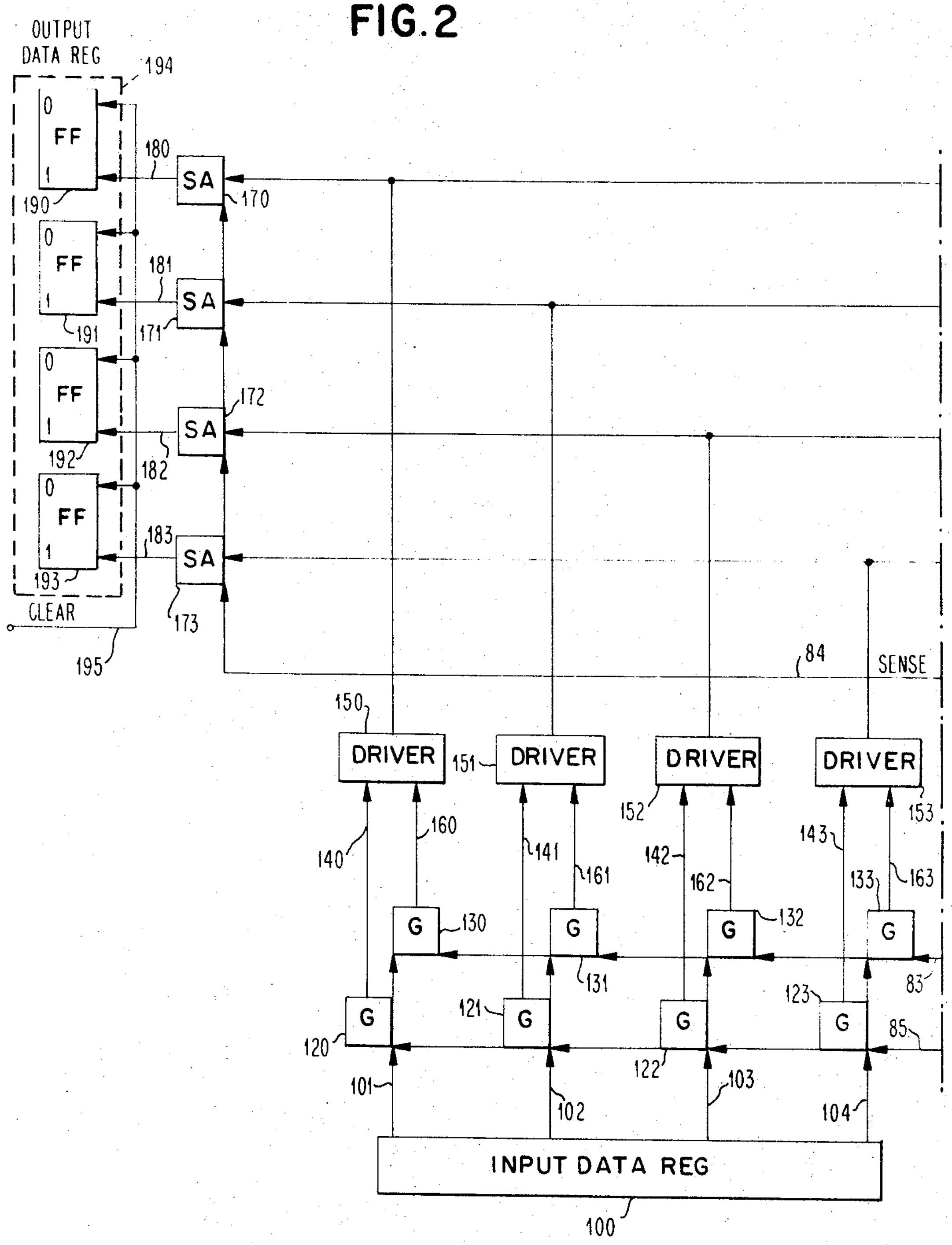

The controller 14 supplies signals on control lines 81 through 85 to manipulate the memory system in FIGS. 1 and 2. Positive logic is arbitrarily employed for the purpose of illustrating the present invention. More specifically, positive signals are significant. Whenever a positive signal appears on the control lines 81 through 85, it is effective to perform the assigned control function. A positive signal on the control line 81 is effective to operate a switch 96 which in turn control a sustain driver 97. The sustain driver 97 receives signals from an oscillator 98 and passes them to the drivers 60 through 63 which in turn supply the oscillator signals to all of the lines Y1 through Y4. When the control line 81 is energized with a positive signal, it operates the switch 96 which thereby causes the sustain driver 97 to supply oscillator signals of a decreased magnitude through the drivers 60 through 63 to the lines Y1 through Y4. The reason for this is discussed more fully hereinafter with respect to a read operation.

A positive signal on the line 82 is supplied to the set of gates 30 through 33, and it is effective to operate a selected one of these gates, as determined by the address decoder, during a read or write operation. A positive signal on the line 83 is supplied to the set of gates 40 through 43, and it is effective during an erase operation to operate a selected one of these gates as determined by the address decoder 12.

Reference is made next to FIG. 2 wherein an input data register 100 is shown which supplies data signals on lines 101 through 104 to a set of gates 120 through 123 and a set of gates 130 through 133. Th gates 120 through 123 supply data signals on corresponding lines 140 through 143 to respective drivers 150 through 153. The gates 130 through 133 supply signals on corresponding lines 160 through 163 to respective drivers 150 through 153. The drivers 150 through 153 supply signals on respective lines X1 through X4 which are disposed beneath the gas display panel 75. The drivers 150 through 153 supply signals on the coordinate lines X1 through X4 during a write operation as explained more fully hereinafter. During a read operation signals on the lines X1 through X4 are supplied to corresponding sense amplifiers (SA) 170 through 173. During a read operation the sense amplifiers 170 through 173 are sampled by a positive signal on the control line 84 to pass signals from respective lines X1 through X4 via associated lines 180 through 183 to the one input side of respective flip flops 190 through 193 which constitute an output data register 194. The output data register 194 is cleared by a positive signal on a line 195 prior to receiving data signals from the sense amplifiers 170 through 173.

The control lines 83 supplies a positive signal to the set of gates 130 through 133 during an erase operation, and the positive control signal on the line 83 is effective to operate one or more of the gates 130 through 133 depending upon the content of the input data register 100. A positive signal on the control line 85 is supplied to the gates 120 through 123 during a write operation, and this positive control signal is effective to operate one or more of these gates depending upon the content of the inut data register 100.

Figure 3:
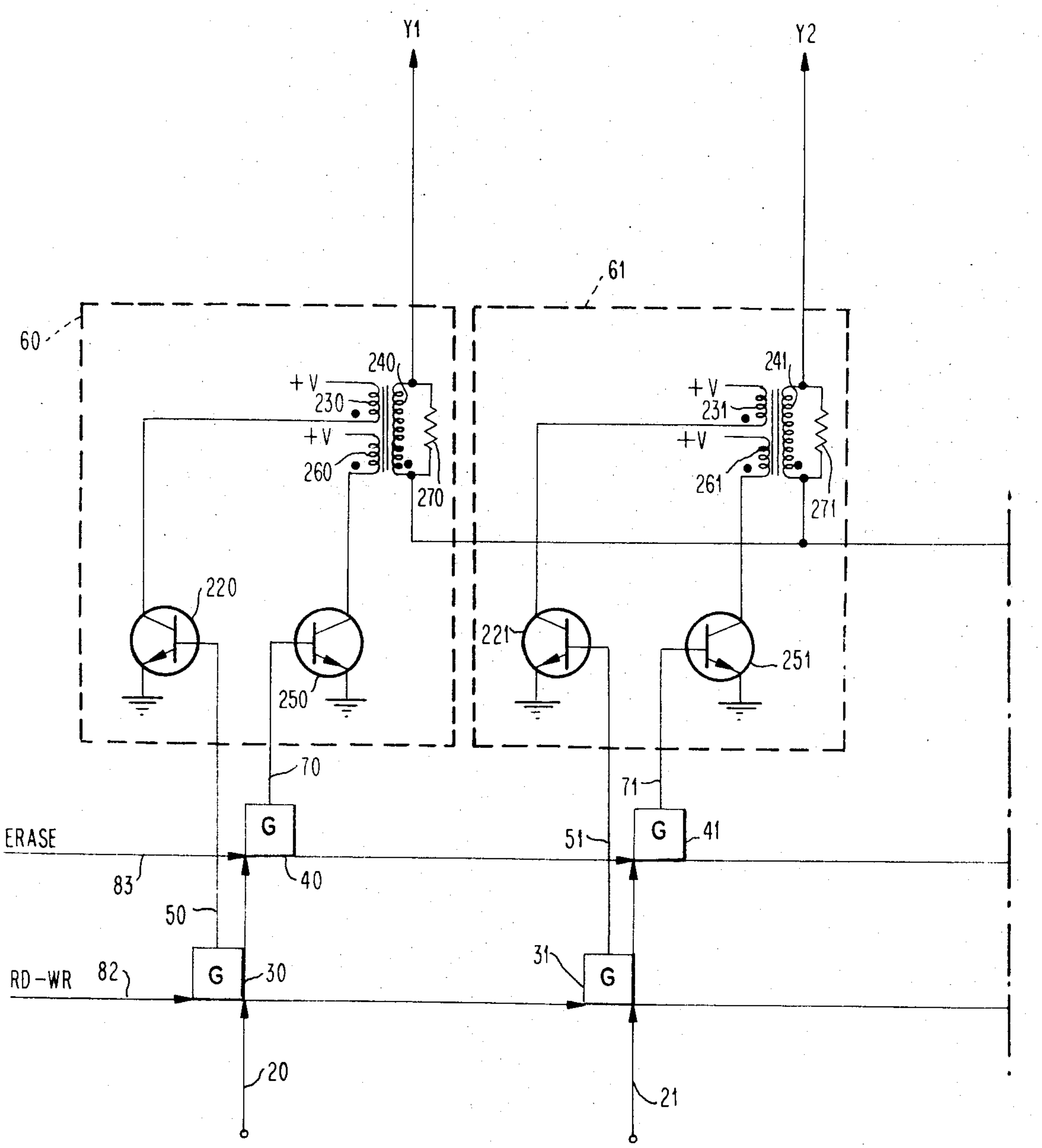
FIGS. 3 and 4 illustrate in detail the drivers and associated gates for the Y drive lines.
Figure 4:
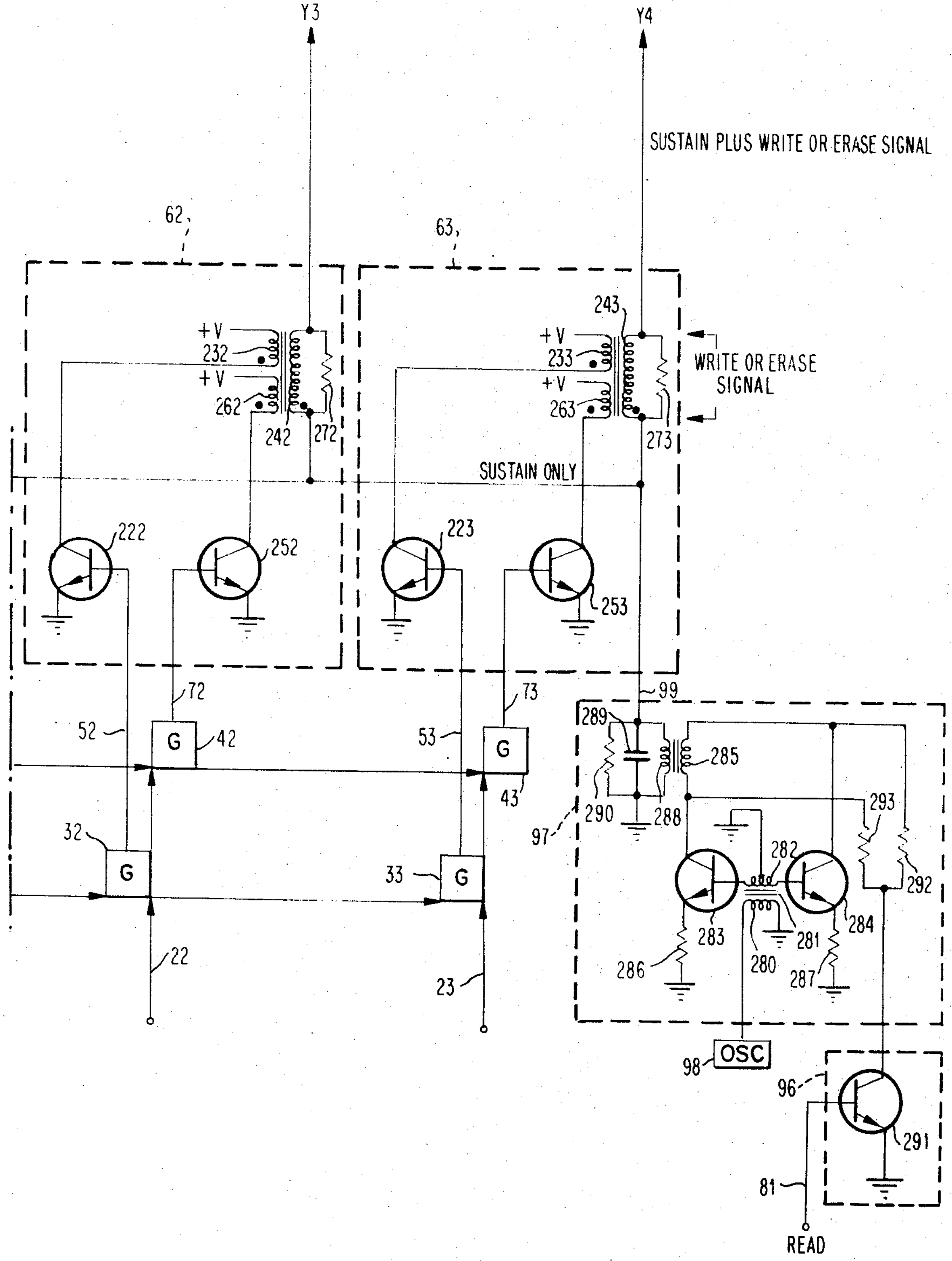

Reference is made next to FIGS. 3 and 4 which illustrate in detail the drivers 60 through 63 and the sustain driver 97 which are shown in block form in FIG. 1. The relationship of gates 30 through 33 and 40 through 43 with respect to the drivers 60 through 63 is clearly depicted in FIGS. 3 and 4. Positive signals from the gates 30 through 33 are applied along the lines 50 through 53 to operate respective transistors 220 through 223 to the conductive state. When operated to the conductive state, each of these transistors causes current to flow from a source of potential through respective primary windings 230 through 233, and signals induced in associated secondary windings 240 through 243 are applied to the respective coordinate lines Y1 through Y4.

Positive signals from the gates 40 through 43 are conveyed along the lines 70 through 73 to operate respective transistors 250 through 253 to the conductive state. When the transistors 250 through 253 are rendered conductive current from a source of potential flows through respective primary windings 260 through 263, and signals induced in associated secondary windings 240 through 243 are applied to the coordinate drive lines Y1 through Y4. The secondary windings 240 through 243 have corresponding resistors 270 through 273 connected thereacross.

The sustain driver 97 in FIG. 4 responds to sinusoidal signals from the oscillator 98 which are applied to a primary winding 280 of a transformer 281. Signals induced into a secondary winding 282 are supplied to transistors 283 and 284. The center tap of the secondary winding 282 is grounded. The transistors 283 and 284 are connected to opposite sides of a primary winding 285 as shown. A resistor 286 is connected between the transistor 283 and ground, and a resistor 287 is connected between the transistor 284 and ground. Sinusoidal signals from the oscillator 98 supplied to the primary winding 285 induce sinusoidal signals in a secondary winding 288 which are supplied in turn to the coordinate drive lines Y1 through Y4. A condenser 289 and a resistor 290 are connected across the secondary winding 288.

The sustain switch 96 is shown in FIG. 4 as a transistor 291 which is connected between ground and the junction point of resistors 292 and 293. The resistors 292 and 293 are connected in series across the primary winding 285. When a positive signal level is supplied to the control line 81, the transistor 291 is driven into conduction, thereby grounding the junction of the resistors 292 and 293. This causes a reduction in the amplitude of the sinusoidal oscillator signals supplied to the primary winding 285, and consequently the sinusoidal signals supplied through the secondary winding 288 to the coordinate drive lines Y1 through Y4 are likewise reduced. When the positive signal on the control line 81 is terminated, the transistor 291 returns to the non-conducting state, and the full amplitude of the sinusoidal oscillator signals supplied to the primary winding 285 is restored. Therefore, full amplitude of the sinusoidal signal supplied to the coordinate drive lines Y1 through Y4 is likewise restored.

Figure 5:
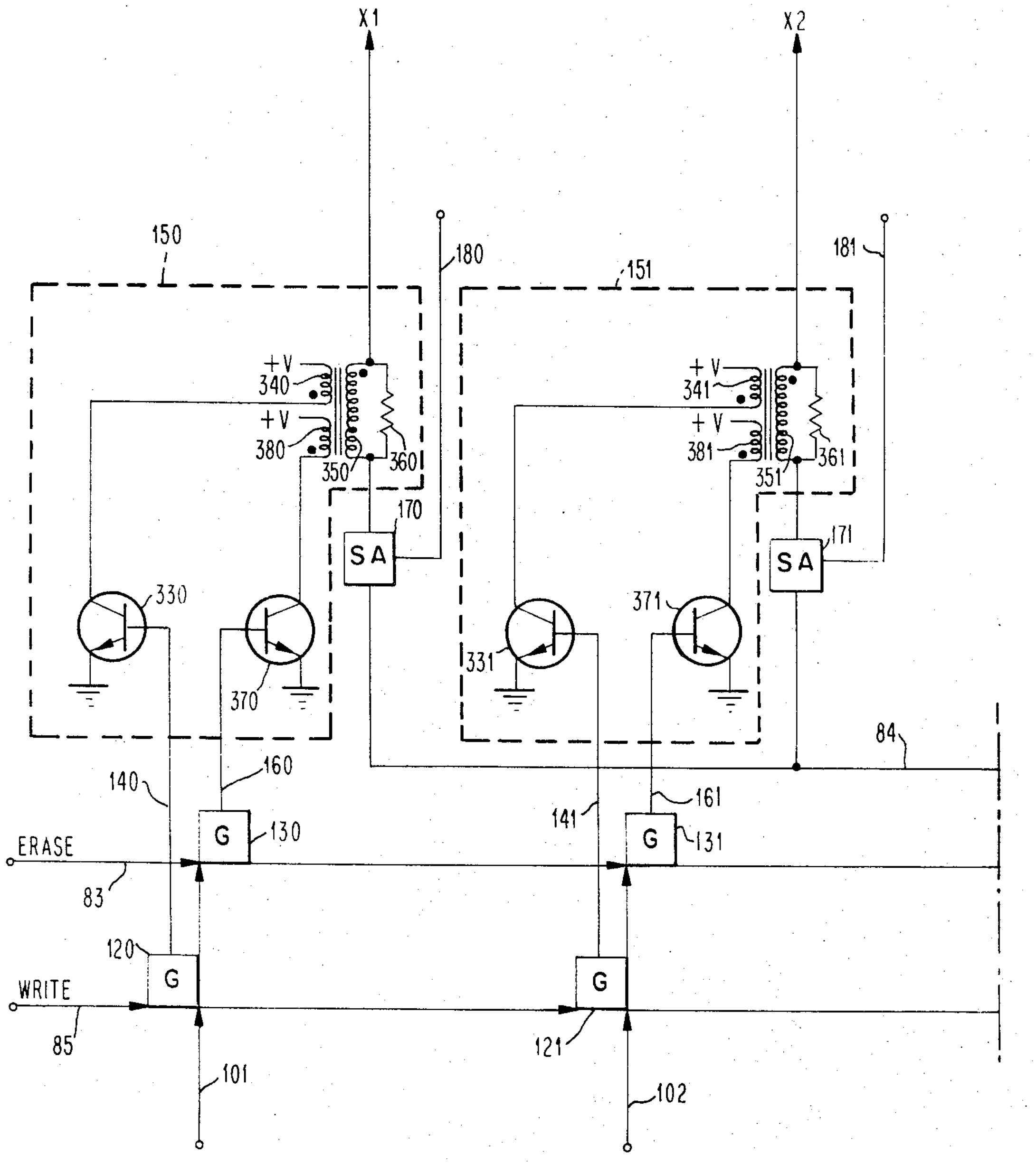
FIGS. 5 and 6 illustrate in detail the drivers, associated gates, and the sense amplifiers for the X coordinate lines.
Figure 6:
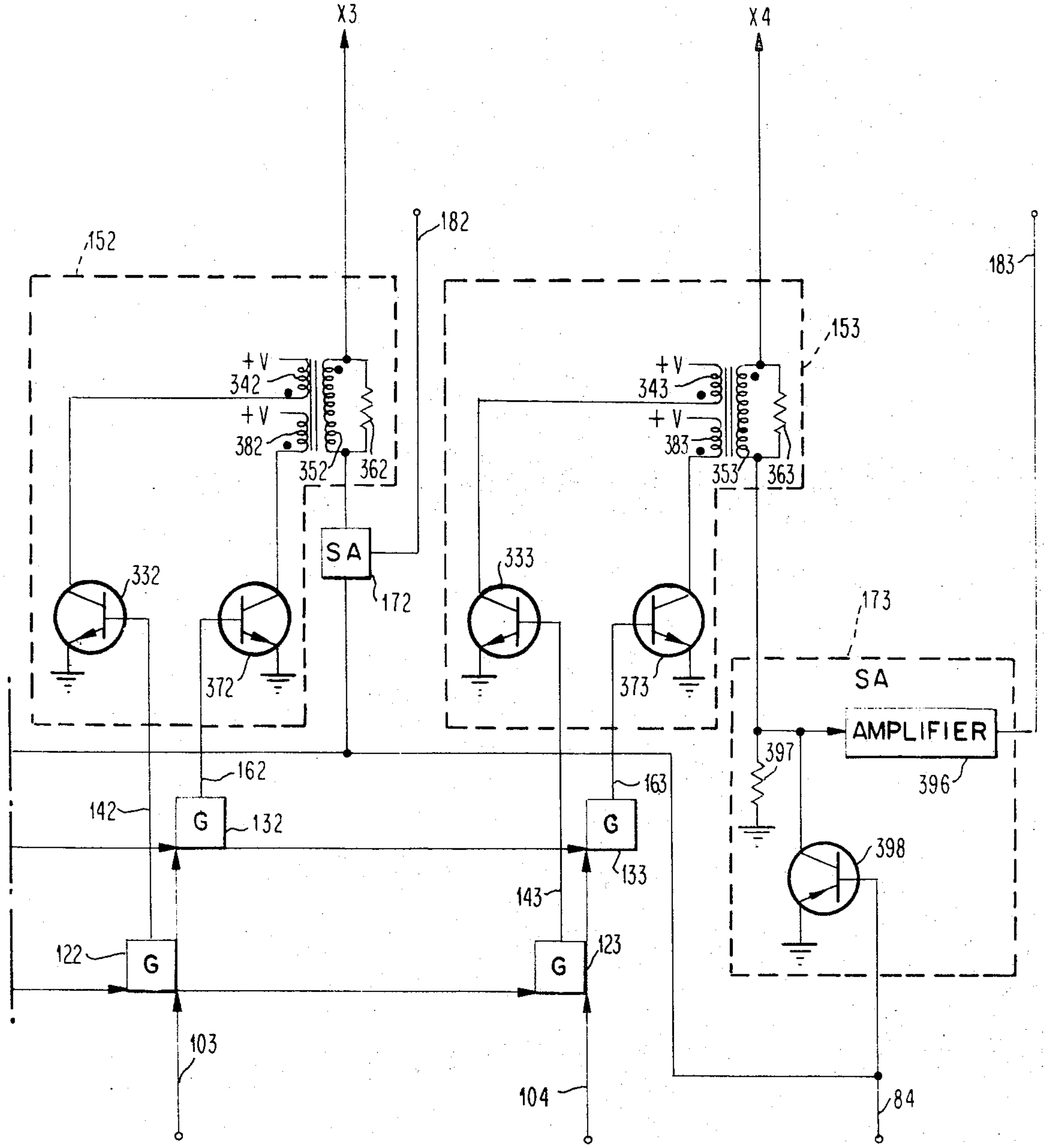

Reference is made next to FIGS. 5 and 6 which illustrate in detail the drivers 150 through 153 which are shown in block form in FIG. 2. The relationship of the gates 120 through 123, the gates 130 through 133 and the sense amplifiers 170 through 173 with respect to the drivers 150 through 153 is clearly depicted in FIGS. 5 and 6. Positive signals from the gates 120 through 123 are effective to operate respective transistors 330 through 333 to the conductive state. The transistors 330 through 333 are connected through respective primary windings 340 through 343 to a source of potential. When the transistors 330 through 333 are rendered conductive, current flows from the source of potential through corresponding primary windings 340 through 343 to ground, and signals are induced in associated secondary windings 350 through 353. The secondary windings 350 through 353 have respective resistors 360 through 363 connected thereacross. Signals induced in the secondary windings 350 through 353 are applied to corresponding coordinate drive lines X1 through X4.

Positive signals from the gate 130 through 133 in FIGS. 5 and 6 operate respective transistors 370 through 373 to the conductive state. When the transistors 370 through 373 are rendered conductive, current flows from a source of potential through corresponding primary windings 380 through 383 to ground, and signals induced in respective secondary windings 350 through 353 are supplied to the coordinate drive lines X1 through X4.

The sense amplifier 173 in FIG. 6 includes an amplifier 396 and a resistor 397 and a transistor 398 connected, as shown. When current flows in the coordinate line X4 during a read operation, a voltage drop is developed across the resistor 397, and this signal is applied to the input of the amplifier 396. When the input signal is positive, an amplified version of such positive signal is supplied on the output line 183 to set the flip flop 193 in FIG. 2 to the one state. The transistor 398 is connected across the resistor 397. A negative signal level is established on the line 84 which operates the transistor 398 to the conductive state, and it thereby shorts out the resistor 397 and grounds the input to the sense amplifier 396 at all times except when a read operation is in process. This is done to prevent relatively large signals induced in the secondary winding 353 from being applied to the sensitive amplifier 396 during write or erase operations. The amplifier 396 is used only during read operations, and a positive signal level on the control line 84 is supplied by the controller 14 in FIG. 1 for a selected period of time during such read operations. The positive control signal is effective to operate the transistor 398 to the non conductive state so that current on the line X4 may pass through the resistor 397 and provide a voltage to the input of the amplifier 396 which is representative of the binary information read. The sense amplifiers 170 through 172 in FIGS. 5 and 6 have circuits, not shown in the interest of simplicity, like that illustrated in the sense amplifier 173 in FIG. 6. Thus the sense amplifiers 170 through 172 respond to a positive signal on the control line 84 during a read operation to sense the signals on respective coordinate lines X1 through X3 and provide output signals on corresponding lines 130 through 182 which set respective flip flops 190 through 192 in FIG. 2 to represent the binary information read.

Figure 7:
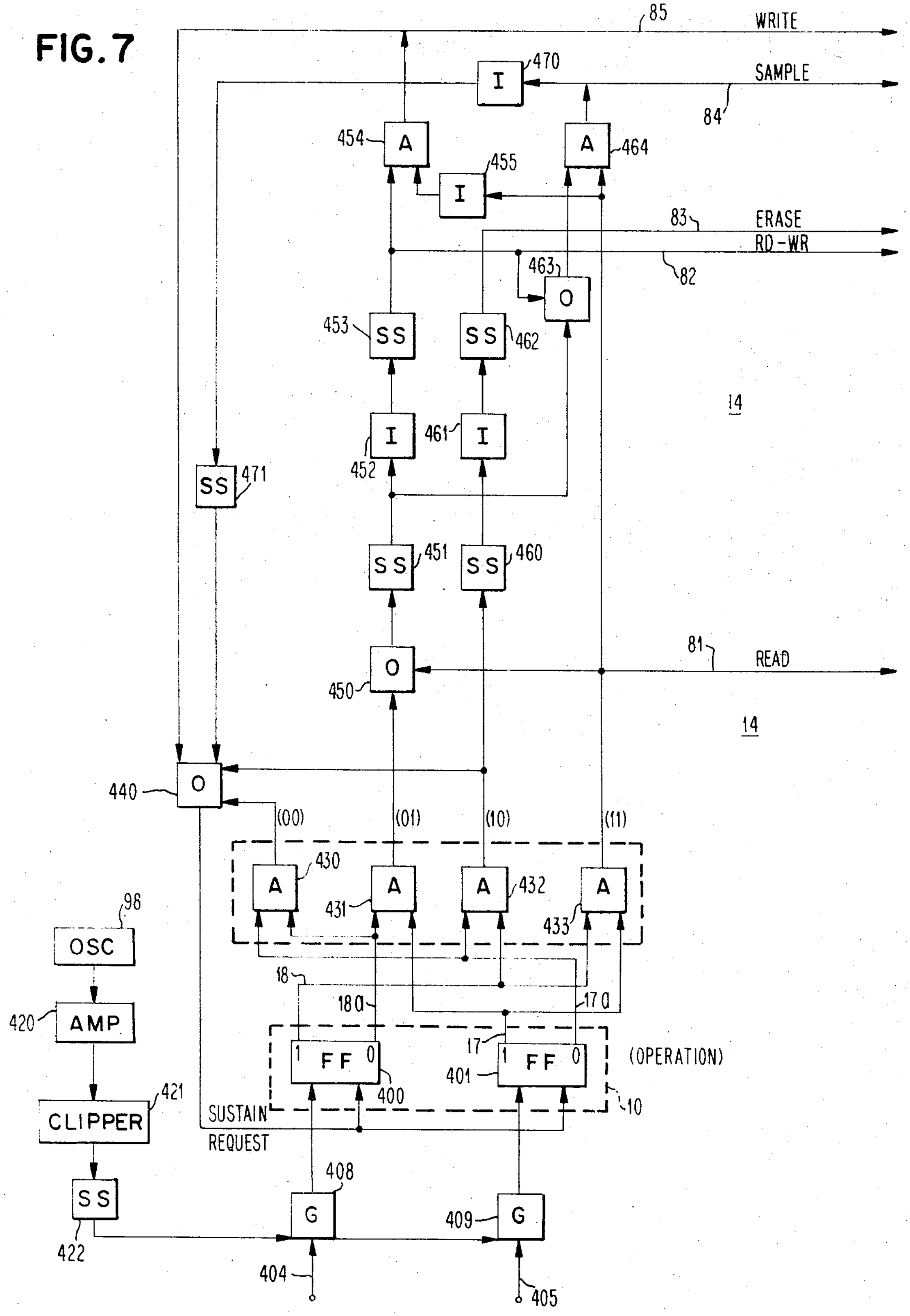
FIG. 7 illustrates in detail the controller 14, shown in block form in FIG. 1.

Reference is made next to FIG. 7 which illustrates in detail the controller 14 shown in block form in FIG. 1. The operation portion of the control register 10 in FIG. 1 is shown in FIG. 7 as including flip flops 400 and 401. Instruction signals on input lines 404 and 405 are supplied through gates 408 and 409 to respective flip flops 400 and 401. The operation codes stored in the flip flops 400 and 401 operate the memory system in FIGS. 1 and 2 during each oscillator cycle to perform the functions indicated in Table 1 below:

TABLE 1

| Function | Code |
|---|---|
| 00 | Sustain Only |
| 01 | Write |
| 10 | Erase |
| 11 | Read |

Figure 8:
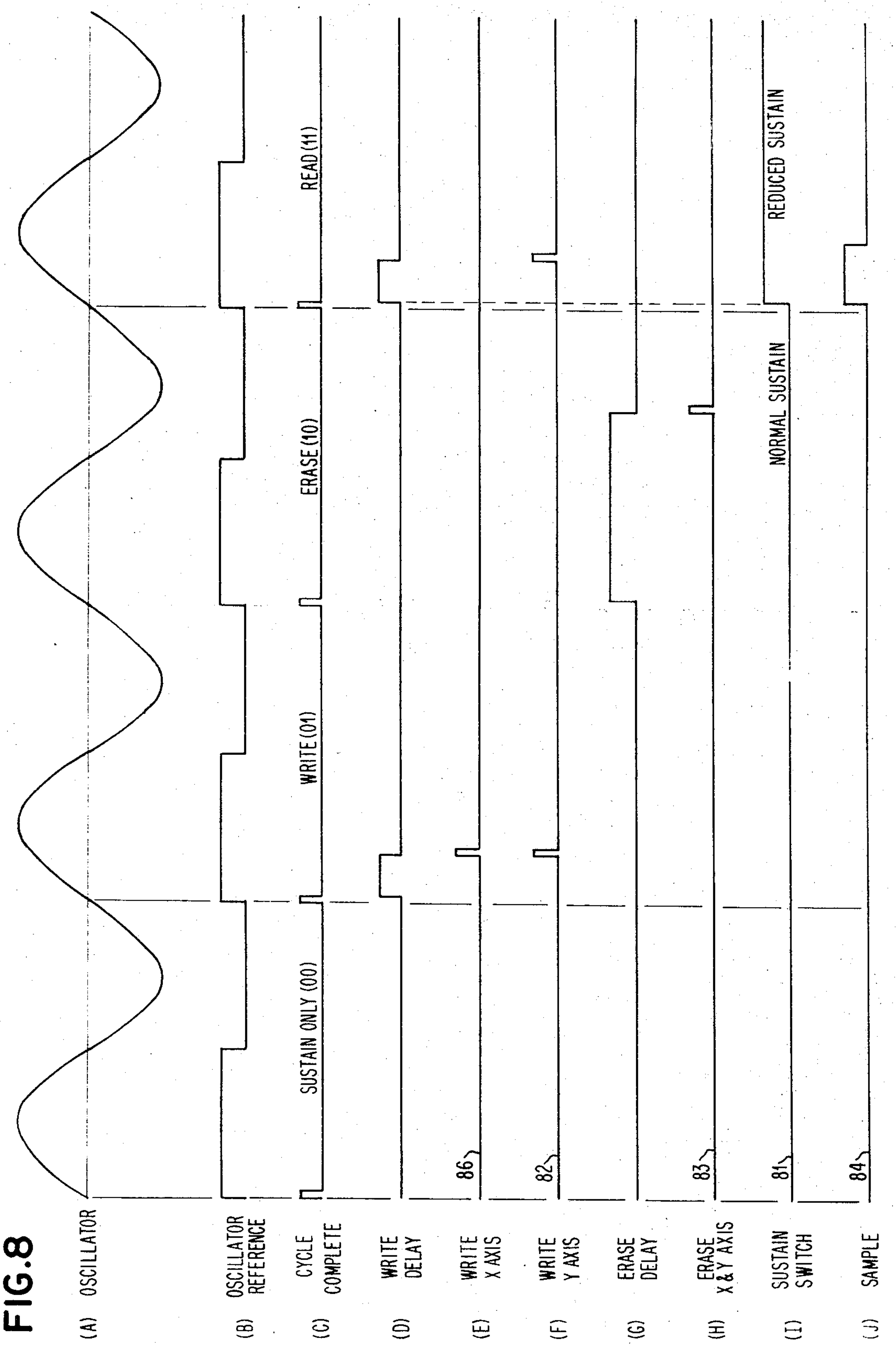
FIG. 8 illustrates wave forms which are helpful in explaining the operation of the system in FIGS. 1 and 2.

Wave forms A through J in FIG. 8 show signals generated by the controller 14 in FIG. 7, and reference is made to these waveforms in the ensuing description of the controller 14. The oscillator 98 in FIG. 7 supplies a sinusoidal signal, as illustrated by the waveform A in FIG. 8, to an amplifier 420 which in turn supplies the amplified signal to a clipper 421. The output signal from the clipper 421 is substantially a square wave as illustrated by the waveform B in FIG. 8. The square wave signal from the clipper 421 is supplied to a single shot 422, and the output signal of the single shot 422 is a series of short pulses as indicated by the curve C in FIG. 8. The short positive pulses from the single shot 422 define precisely the beginning of each full cycle of the oscillator wave in curve A of FIG. 8. The positive pulses from the single shot 422 operate the gates 408 and 409 to pass positive signals on the lines 404 and 405 to set the associated flip flops 400 and 401 with the appropriate operation code at the beginning of each oscillator cycle.

Operation codes are represented by signals stored in the flip flops 400 and 401. Signals on the lines 18 and **18*a* from the flip flop 400 and signals on the lines 17 and 17*a* from the flip flop 401 are supplied to And circuits 430 through 433. When both of the flip flops 400 and 401 are set to the zero state, their zero output sides supply positive signals on respective lines 18*a* and 17*a* to operate the And circuit 430, and it supplies a positive output signal to an Or circuit 440. The Or circuit 440 in turn supplies a positive signal, labelled sustain request, to the zero input sides of the flip flops 400 and 401** which thereby insures that these flip flops remain in the reset state for the entire sustain cycle.

The And circuit 431 is operated whenever the flip flop 400 provides a positive signal from its zero output side on the line **18*a* and the flip flop 401 provides a positive signal from its one output side of the line 17. A positive signal from the And circuit 431 signifies a write operation, and it is supplied through an Or circuit 450 to a single shot 451. The single shot 451 provides a positive output pulse, termed write delay, as shown in curve D of FIG. 8. The output signal from the single shot 451 is supplied through an inverter 452 to a single shot 453, and this single shot provides a positive output pulse on the control line 82. This pulse is the left most pulse shown in curve F of FIG. 8. The positive pulses on the line 82 are passed by an And circuit 454 to the control line 85, and these pulses are illustrated by the curve E in FIG. 8. The And circuit 454 passes positive signals from the single shot 453 whenever a negative output signal is provided from the And circuit 433. The negative signal from the And circuit 433 is inverted by an inverter 455, thereby to condition the And circuit 454 to pass positive signals from the single shot 453 to the output control line 85. Positive signals from the And circuit 454 are supplied through the Or circuit 440 to reset the flip flops 400 and 401. The positive pulses from the single shots 451 and 453 are supplied through an Or circuit 463 to an And circuit 464, but they are not passed by the And circuit 464 during a write operation since the And circuit supplies a negative output signal to the And circuit 464** at such time.

The And circuit 432 supplies a positive output signal whenever the flip flop 400 supplies a positive signal from the one output side on the line 18 and the flip flop 401 supplies a positive signal from the zero output side on the line 17a. A positive signal from the And circuit 432 signifies an erase operation, and it is supplied to a single shot 460 which provides a positive output pulse, termed erase delay, as illustrated in curve G of FIG. 8. The positive signal from the And circuit 432 is supplied also through the Or circuit 440 to reset the flip flops 400 and 401. The output signal from the single shot 460 is supplied through an inverter 461 to a single shot 462, and the output signal from the single shot 462 is a short positive pulse as shown in curve H of FIG. 8. The positive pulse from the single shot 462 is supplied on the control line 83.

The And circuit 433 provides a positive output signal when the flip flop 400 supplies a positive signal from the one output side on the line 18 and the flip flop 401 supplies a positive signal from the one output side on the line 17. A positive signal from the And circuit 433 signifies a read operation. A positive signal from the And circuit 433 is supplied to the And circuit 464 and to the Or circuit 450. The positive signal passed by the Or circuit 450 operates the single shot 451, and the resulting positive output signal from the single shot 451 is passed by the inverter 452 to operate the single shot 453 which provide a positive output pulse on the line 82. This pulse is the rightmost pulse shown by the curve F in FIG. 8. The positive signal from the single shot 451 and the positive signal from the single shot 453 are passed by the Or circuit 463 to the And circuit 464, and they cause the output of the And circuit 464 on the line 84 to be a positive signal of prolonged duration as illustrated by the curve J in FIG. 9. The positive pulse in curve J in FIG. 9 has a duration equal to the total duration of the positive pulse from the single shot 451 and the positive pulse from the single shot 453. The positive pulse from the And circuit 464 is supplied through an inverter 470 to a single shot 471. Upon termination of the positive pulse from the And circuit 464, the inverter 470 supplies a positive going output signal which operates the single shot 471, and the resulting positive output pulse is supplied the Or circuit 440 to reset the flip flops 400 and 401.

The storage element according to this invention is a gas cell. A gas cell is defined as the gaseous region lining between an X coordinate drive line and a Y coordinate drive line. The gas panel 75 in FIG. 1, therefore, has 16 gas cells defined by the Y1 through Y4 coordinate drive lines and the X1 through X4 coordinate drive lines. Next, some of the characteristics of the gas cell are discussed, and the manner in which information may be stored, read, and erased is described. For this purpose reference is made to FIGS. 9 through 12.

Figure 9:
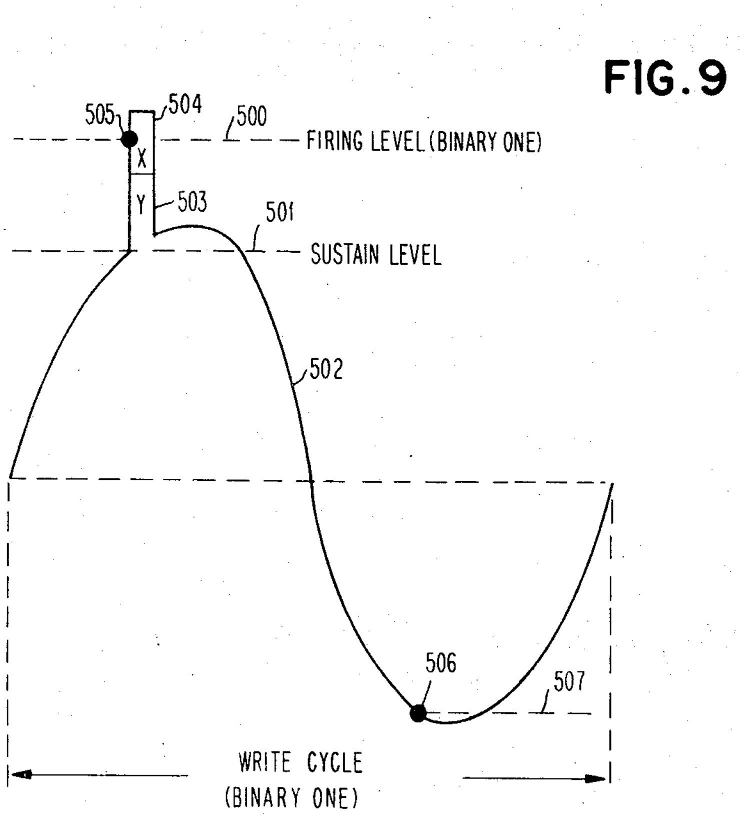
FIGS. 9 through 12 are curves which are helpful in illustrating the operation of a gas cell according to this invention.

Reference is made first to FIG. 9 which illustrates a write operation. One important characteristic of each gas cell should be explained first. If a potential difference of a given magnitude is applied across a gas cell, it ignites, and the gas cell is illuminated. Such a level is indicated by the dotted line 500 in FIG. 9, and this level must be equaled or exceeded in order to write or store a binary one. Once a gas cell has been subjected to such a firing level, it thereafter may be again ignited and illuminated by the application of a substantially lower potential difference applied across the gas cell. Such a lower level is indicated by the dotted line 501 in FIG. 9, and this is designated as a sustain level. The substain level must be periodically applied in order to perpetuate the storage of binary one bits.

A binary one is written by applying a potential difference across the gas cell which exceeds the firing level indicated by the line 500 in FIG. 9. This is done according to this invention by simultaneously supplying (1) a sinusoidal sustain level 502 and a pulse 503 to the selected Y coordinate drive line and (2) a pulse 504 to the associated X coordinate drive line. The writing operation preferably takes place in the positive half of the sinusoidal wave 502 in which case the pulse 503 applied to the Y coordinate drive line is a positive pulse, and the pulse 504 applied to the X coordinate drive line is a negative pulse. It is pointed out that a negative pulse on the X drive line and a positive pulse on the Y drive line create a potential difference which is equal to the sum of their amplitudes. FIG. 9 depicts the equivalent potential difference thus produced across the selected gas cell. Thus the total potential difference produced across the selected cell by the positive portion of the sinusoidal sustain level 502 and the positive pulse 503 on the Y drive line and the negative pulse 504 on the associated X drive line is sufficient to exceed the firing level indicated by the dotted line 500. Consequently, the gas cell fires, and this state is designated as the binary one state of the gas cell. The gas cell is ignited momentarily, and this is indicated by the dot 505 in FIG. 9.

Figure 11:
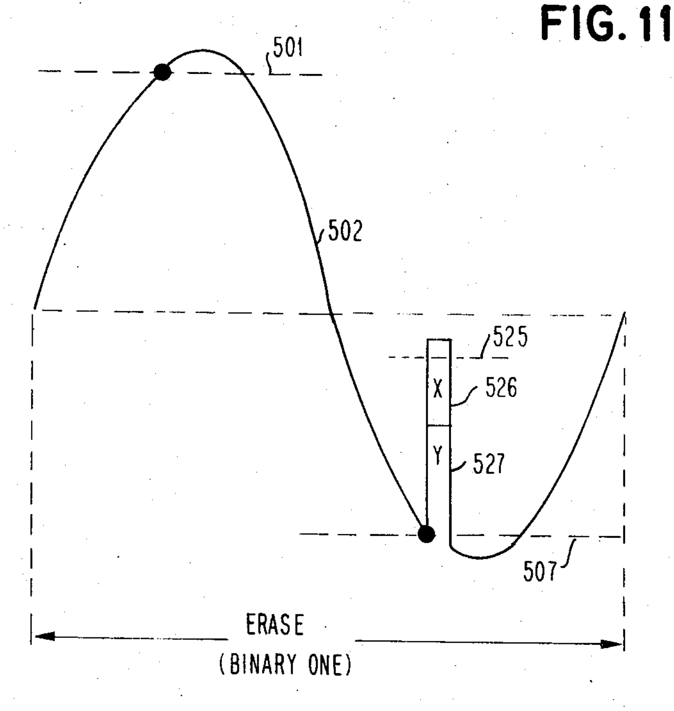
Figure 12:
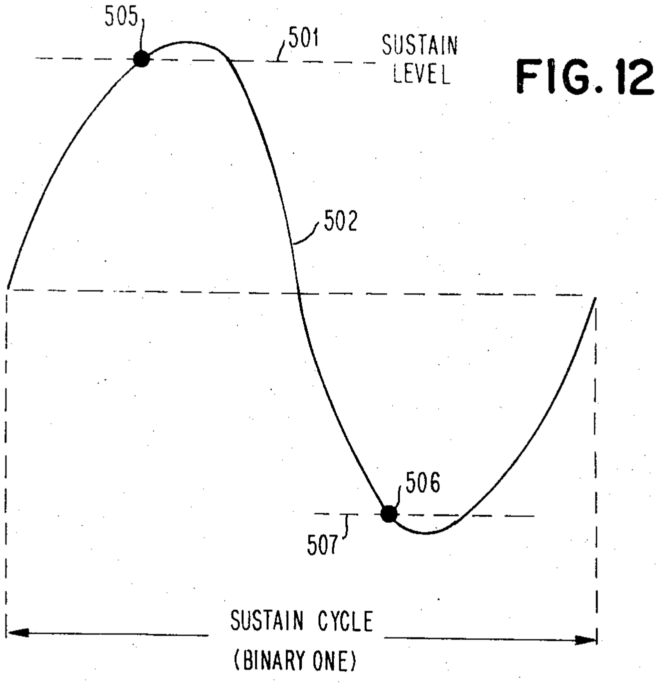

The sustain level depicted in FIGS. 9, 11 and 12 is a full sustain level, and it is able to re-ignite a cell which is in the binary one state each time that the sustain level is exceeded on the positive and the negative swings of the sinusoidal wave 502. For this reason the selected cell is ignited when the negative swing of the sinusoidal wave 502 in FIG. 9 exceeds the sustain level indicated by the dotted line 507. Ignition of the cell is signified by the dot 506 for the negative excursion of the sinusoidal sustain signal 502.

A sustain cycle for a cell holding a binary one is illustrated in FIG. 12. Each time the positive excursion of the sinusoidal sustain signal 502 equals or exceeds the sustain level 501, the gas cell is momentarily ignited as cient to change the state of the gas cells in the storage register addressed by the coordinate line Y1.

The positive pulse on the line 82 in FIG. 1 is supplied to the And circuit 454 in FIG. 7. The And circuit 433 in FIG. 7 supplies a negative output signal which is inverted by the inverter 455 to a positive level which is supplied to the And circuit 454. Consequently, the positive pulse on the line 82 is passed through the And circuit 454 to the control line 85. The positive signal on the control line 85 passes through the Or circuit 440 in FIG. 7 to reset the flip flops 400 and 401. The positive signal on the control line 85 is supplied also to the gates 120 through 123 in FIG. 2. The binary word 0101 stored in the register 100 causes positive signals to be established on the lines 102, 104 and negative signals to be established on the lines 101, 103. Consequently, the positive pulse on the line 85 in FIG. 2 passes through the gates 121 and 123 along respective lines 141 and 143 to associated drivers 151 and 153. The positive signal on the line 141 in FIG. 2 operates the transistor 331 in FIG. 5 and causes a current to flow from a source of potential through the winding 341 to ground. Consequently a negative pulse is induced in the secondary winding 351 and applied to the coordinate drive line X2.

The positive signal on the line 143 in FIG. 2 operates the transistor 333 in FIG. 6, and current flows from a source of potential through the winding 343 to ground. Consequently, a negative pulse is induced in the secondary winding 353 and applied to the coordinate drive line X4. The negative pulse on the coordinate drive line X2 results from the positive pulse, depicted in FIG. 8E, on the control line 85. Likewise, the negative pulse on the coordinate drive line X4 results from the positive pulse, depicted in FIG. 8E, on the control line 85.

It is seen, therefore, that the gas cells at the coordinate intersections Y1, X2 and Y1, X4 have a potential difference applied thereacross of a magnitude equal to that represented by the positive swing of the sinusoidal sustain signal 502, the pulse 503, and the pulse 504 in FIG. 9. The magnitude of the potential difference is sufficient to equal or exceed the firing level represented by the dotted line 500 in FIG. 9, and the gas cells at these coordinate intersections are fired. The firing potential causes these two gas cells to be illuminated briefly, and they are regenerated each time the sinusoidal sustain signal 502 equals or exceeds the sustain level indicated by the lines 501 and 507 in FIG. 9. The gas cells at the coordinate intersections Y1, X1 and Y1, X4 receive no signals on the respective drive lines X1 and X3. The sustain signal 502 in FIG. 9 and the pulse 503 applied to the coordinate drive line Y1 are not sufficient to fire the cells at these coordinate intersections, and they remain in the zero state. Thus it is seen how the binary word 0101 is written in the register addressed by the coordinate drive line Y1 in FIG. 1.

Next, let it be assumed for purposes of illustration that the binary word 0101 in the storage register addressed by the coordinate drive line Y1 is to be read. Address signals are supplied to the address portion of the control register 10 which operate the address decoder 12 to supply a positive signal on the line 20. The operation code 11 is supplied to the operation portion of the control register 10. More specifically, positive signals are supplied on the lines 404 and 405 in FIG. 7 which are passed by the gates 408 and 409 at the beginning of an oscillator cycle in response to a short positive pulse, labelled cycle complete and depicted in FIG. 8C, applied to the gates 408 and 409. Positive pulses passed by these gates set the flip flops 400 and 401. Signals from these flip flops operate the And circuit 433 to supply a positive output signal (1) to the And circuit 464 and (2) through the Or circuit 450 to the single shot 451. A positive output signal from the single shot 451, designated write delay and depicted in FIG. 8D, is supplied through the Or circuit 463 to operate the And circuit 464 and provide a positive output pulse labelled sample which is depicted in FIG. 8J. When the write delay pulse in FIG. 8D terminates, the inverter 452 supplies a positive going signal which operates the single shot 453 to supply a positive output pulse on the line 82 which is depicted at the right in FIG. 8F. The positive pulse on the line 82 is supplied also through the Or circuit 463 to the And circuit 464, and this continues the positive output signal on the line 84. When the start positive pulse on the line 82 terminates, the And circuit 464 in FIG. 7 is deactivated, thereby terminating the positive pulse on the line 84 which is designated sense gate and depicted in FIG. 8 (J). When this pulse terminates, the inverter 470 supplies a positive going output signal which operates the single shot 471, and it supplies a positive output pulse through the Or circuit 440 to reset the flip flops 400 and 401.

The positive output signal from the And circuit 433 is supplied on the line 81, and this signal, designated reduced sustain and depicted in FIG. 8 i, is supplied to the switch 96 in FIG. 1. As illustrated in greater detail in FIG. 4, the positive signal on the line 81 operates the transistor 291, constituting the switch 96, and grounds the junction of the resistors 292 and 293. As a result the amplitude of the sinusoidal signals from the oscillator 98 are reduced, and the reduced sinusoidal sustain signal supplied by the secondary winding 288 in FIG. 4 to the line 99 has a magnitude as depicted in FIG. 10.

The short positive pulse supplied on the control line 82 in FIG. 7 is supplied to the gates 30 through 33 in FIG. 1. This positive pulse is passed by the gate 30 which is conditioned by a positive signal level on the line 20. The positive pulse from the gate 30 is passed on the line 50 to the driver 60. The positive signal on the line 50 operates the transistor 220 in FIG. 3 to establish a positive pulse on the coordinate drive line Y1. Therefore, the coordinate drive line Y1 receives a signal having a magnitude equal to the sum of the positive pulse 521 and the positive swing of the sinusoidal signal 520 in FIG. 10. The magnitude of this signal equals or exceeds the sustain level indicated by the dotted line 501, and all gas cells associated with the Y1 drive line are ignited if they are in the binary one state. Consequently, the cells Y1, X2 and Y1, X4 are briefly ignited, and current flows from the line Y1 through these cells to the respective coordinate lines X2 and X4. Current on the coordinate line X4 flows through the resistor 397 in FIG. 6, and a positive voltage is supplied to the sense amplifier 396. The positive sample pulse on the line 84 operates the transistor 398 to the nonconductive state, thereby unshorting the resistor 397 and permitting the current on the line X4 to pass through this resistor. The current through the resistor 397 produces a positive signal which is amplified by the sense amplifier 173 and supplied on the output line 183 to the binary one input side of the flip flop 193. Thus the flip flop 193 is set to the binary one state. In like indicated by the dot 505. When the negative excursion of the sinusoidal signal 502 exceeds the sustain level as indicated by the dotted line 507, the gas cell is momentarily fired again, and this is indicated by the dot 506 in FIG. 12. The binary one state of a gas cell may be perpetuated for as long a period as desired by periodically providing a sustain cycle.

Figure 10:
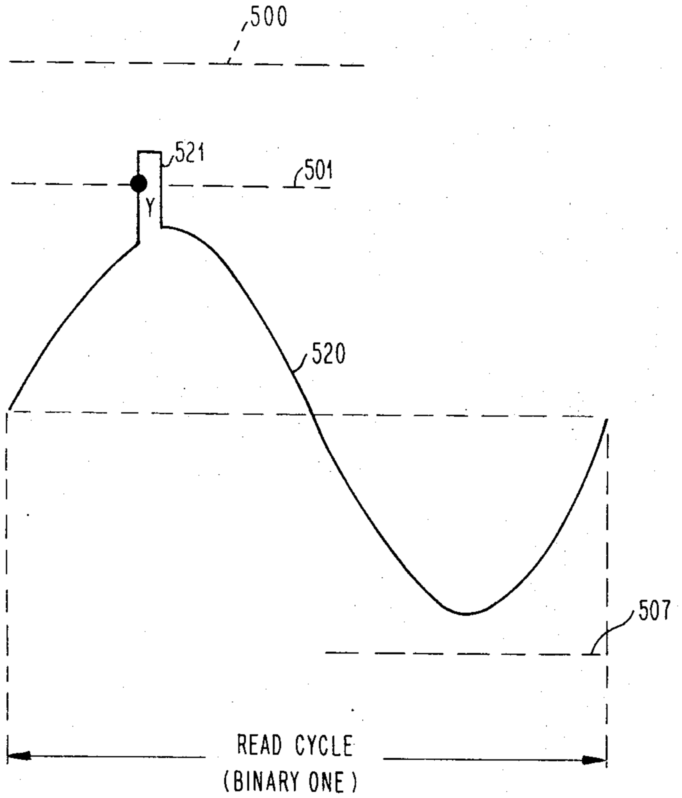

A read cycle for a gas cell is illustrated in FIG. 10, and for this purpose the sinusoidal sustain signal 502 in FIG. 9 is reduced below the sustain level 501 as illustrated by the reduced sinusoidal sustain signal 520 in FIG. 10. A positive pulse 521 is supplied to the associated Y drive line during the positive excursion of the reduced sinusoidal sustain signal 520 in FIG. 10. The total potential difference established across the gas cell by the positive pulse 521 and the positive excursion of the reduced sinusoidal sustain signal 520 on the associated Y coordinate drive line is sufficient to exceed the sustain level 501 and ignite the gas cell. When the gas cell is ignited, it causes a signal transfer to take place between the Y drive line and the associated X drive line. The signal on the X drive line may be detected to indicate that a binary one is stored. If a gas cell is in the binary zero state, it is not ignited by the combined potential difference established across the cell by the positive sinusoidal swing of the reduced sustain wave 520 and the pulse 521 because a gas cell in the binary zero state cannot be ignited unless the applied potential difference equals or exceeds the firing level indicated by the dotted line 500 in FIG. 10. Consequently, if a cell stores a binary zero, no signal transfer takes place between the associated Y coordinate and the X coordinate line, and the absence of a signal during a read operation indicates that a binary zero is stored. The negative excursion of the recuded sinsoidal sustain signal 520 in FIG. 10 is not sufficient in magnitude to ignite a gas cell storing a binary one since the sustain level indicated by the dotted line 507 is not equalled or exceeded. Therefore, if a gas cell containing a binary one is read, it must be regenerated by a sustain cycle before it can be read again. In this connection it is pointed out that all bits in the gas panel 75 of FIG. 1 may be read once, and then all of the binary one bits may be regenerated by a single sustain cycle.

FIG. 11 illustrates an erase cycle, and such a cycle is used to clear a storage register by returning all bits to the binary zero state. If a bit is in the binary one state, it is returned to the binary zero state during an erase operation by applying a relatively low potential difference across the gas cell for a brief interval. As illustrated in FIG. 11, a cell in the binary one state is returned to the binary zero state by simultaneously applying (1) a negative pulse 526 on the associated X drive line and (2) a positive pulse 527 and a negative swing of the sustain signal 502 to the associated Y drive line. An applied potential difference of a magnitude less than that indicated by the dotted line 525 in FIG. 11 changes a gas cell from the binary one state to the binary zero state, and it is readily seen that the net potential difference established across the gas cell by the negative excursion of the sustain signal 502, the positive pulse 527 and the negative pulse 526 is less than the level indicated by the dotted line 525. Consequently, the brief interval during which this low potential level is applied is sufficient to erase the binary one state and establish the binary zero state in the gas cell. It is pointed out that the positive pulse 527 reduces the magnitude of the negative swing of the sinusoidal sustain signal 502, and this potential is applied to the Y drive line. Simultaneously, the negative pulse 526 which is applied to the X drive line causes a further reduction in the potential difference across the gas cell. The pulses 526 and 527 are shown superimposed in FIG. 11 to indicate graphically that the net potential difference across the gas cell is less than the level indicated by the dotted line 525.

Next the operation of the memory system in FIGS. 1 and 2 is discussed. Information in the form of words, each having 4 bits, is stored vertically in the gas panel in FIG. 1. The words are selectively addressed by signals on the drive lines Y1 through Y4. The coordinate drive line Y1 controls the write, read, sustain and erase operations of the word defined by the cells at the coordinate intersections (Y1, X1), (Y1, X2), (Y1, X3), and (Y1, X4). In like fashion the coordinate drive lines Y2 through Y4 control the respective storage registers defined by the gas cells at the associated coordinate intersections.

Let it be assumed for purposes of illustration that the binary word 0101 is to be written in the vertically disposed storage register controlled by the drive line Y1. This information is inserted in the input date register 100 in FIG. 2. The operation code 01 is inserted in the operation position of the control register 10 in FIG. 1. More specifically, positive signal representing a binary one is applied to the line 405 in FIG. 7, and a negative signal representing a binary one is applied to the line 405 in FIG. 7, and a negative signal representing binary zero is applied to the line 404. A cycle complete pulse from the single shot 422 is applied to the gates 408 and 409 to insert the operation code in the flip flops 400 and 401. This causes the operation register 10 to operate the And circuit 431 to supply a positive output signal through the Or circuit 450 to the single shot 451. The single shot 451 then provides a positive pulse, as indicated in FIG. 8D, and upon termination of this positive pulse, the inverter 452 supplies a positive going signal which operates the single shot 453 to provide a positive output pulse, as shown in FIG. 8E, on the line 82. The positive signal on the line 82 is supplied to the gates 30 through 33 in FIG. 1. Address signals inserted in the address portion of the control register 10 at the beginning of the write cycle supply control signals on the lines 16, **16*a*, 15, and 15*a* which operate the decoder 12 to provide a positive output signal on the line 20. The positive signal on the line 20 is supplied to the gates 30 and 40, but only the gate 30 is operated to provide a positive output signal on the line 50 to the driver 60. The positive signal on the line 50 operates the transistor 220 in FIG. 3 which causes current to flow from a source of potential through the winding 230 to ground and thereby induce a positive pulse in the secondary winding 240 which is supplied to the coordinate drive line Y1. Since the switch 96 in FIG. 1 is not operated, the sustain driver 97 supplies a sinusoidal sustain signal on the line 99 which, as illustrated in FIGS. 3 and 4, is conveyed through the drivers 60 through 63 to all Y coordinate drive lines. Consequently, the signal supplied to the coordinate drive line Y1 has an amplitude which is equal to the sum of the instantaneous value of the positive swing of the sinusoidal sustain signal 502 in FIG. 9 and the positive pulse 503. The combined magnitude of these two signals, however, is not suffifashion, current transferred from the coordinate drive line Y1 through the gas cell Y1, X2 to the coordinate line X2 is amplified by the sense amplifier 171 in FIG. 2. The positive output signal from the sense amplifier 171 sets the flip flop 191** to the binary one state.

The cells at the coordinate intersections Y1, X1 and Y1, X3 are in the binary zero state, and no signal transfer takes place between the coordinate drive line Y1 and the coordinate X1 and X3. Consequently, the associated sense amplifiers 170 and 172 do not provide positive output signals to associated flip flops 190 and 192, and the flip flops 190 and 192 remain in the binary zero state. During the negative half of the excursion of the reduced sustain signal 520, depicted in FIG. 10, the gas cells at the coordinate intersections Y1, X2 and Y1, X4 in FIG. 1 are not regenerated because the negative excursion does not equal or exceed the sustain level 507 in FIG. 10. Consequently, the register addressed by the coordinate drive line Y1 cannot be read again until the gas cells of this register undergo a sustain cycle with a full amplitude sustain signal as illustrated in FIG. 12. However, the gas cells at the coordinate intersections Y1, X2 and Y1, X4 have sufficient retentivity to permit the storage registers addressed by the coordinate drive lines Y2, Y3, and Y4 to undergo a read operation, if such is desired, before regeneration by sustain cycle is required. It is permissable to program a read operation of each of the vertical register in turn after which a sustain cycle may be programmed to regenerate all registers at the same time. The controller 14 in FIG. 1 always insures that the flip-flops 400 and 401 in FIG. 7 are reset at all times to initiate sustain cycles except when a read, write, or erase operation is specifically programmed. This insures that stored information is constantly regenerated by sustain cycles.

Next, an erase operation is discussed, and for this purpose let it be assumed that the word stored in the register addressed by the coordinate drive line Y1 is to be erased. Address signals are inserted in the address portion of the control register 10 in FIG. 1. The input data register 100 in FIG. 2 is loaded with binary ones in all storage positions. Consequently, positive output signals are provided on the lines 101 through 104 to the gates 130 through 133. The operation code 10 is inserted in the operation portion of the control register 10 in FIG. 1. A positive signal is supplied on the line 404 in FIG. 7 representing a binary one and a negative-signal is supplied on the line 405 representing a binary zero. When the gates 408 and 409 receive a cycle complete pulse, the flip flop 400 is set the binary one state, and the flip flop 401 remains reset in the binary zero state. Signals from the flip flops 400 and 401 operate the And circuit 432 to supply a positive output signal with operates the signal shot 460, and this positive signal passes through the Or circuit 440 to reset the flip flop 400, whereby both flip flops are reset. The single shot 460 provides a positive output pulse, designated erase delay which is depicted in FIG. 8G, and this signal is inverted by an inverter 461 and applied to a single shot 462. Upon the termination of the positive erase delay pulse, the inverter 461 supplies positive going output pulse which operates the single shot 462 to supply a positive erase pulse on the control line 83 to the gates 40 through 43 in FIG. 1 and 130 through 133 in FIG. 2. The positive erase pulse is depicted in FIG. 8h.

The address portion of the control register 10 in FIG. 1 is set with information to select the register addressed by the coordinate drive line Y1. Consequently the decoder 12 is operated to supply a positive signal on the line 20. The positive pulse on the control line 83 passes through the gate 40 and via the line 70 to the driver 60. The positive pulse on the line 70 operates a transistor 250 in FIG. 3, and a current flows from a source of potential through the winding 260 to ground. A signal induced in the secondary winding 240 is a positive pulse which is applied to the coordinate line Y1, and this pulse is depicted as the pulse 527 in FIG. 11. Since the And circuit 433 in FIG. 7 is not operated during an erase operation, a negative output signal therefrom on the line 81 does not operate the switch 96 in FIG. 1, and therefore the sustain driver 97 supplies a full sustain signal on the line 99 to all of the drivers 60 through 63. The full sustain signal is a sinusoidal signal depicted by the wave 502 in FIG. 11, and it is supplied to all of the coordinate drive lines Y1 through Y4. The line Y1 in FIG. 1, therefore, receives a drive signal which is equal to the magnitude of the negative excursion of the wave 502 in FIG. 11 decreased the magnitude of the positive pulse 527.

Simultaneously as the foregoing signals are applied to the drive line Y1, the positive erase signal on the control line 83 in FIG. 2 causes positive signals to be emitted from each of the gates 130 through 133 on the lines 160 through 163 to corresponding drivers 150 through 153. Positive signals on the line 160 through 163 operate respective transistors 370 through 373 and cause current to flow from potential sources through respective primary windings 380 through 383 to ground and thereby induce in secondary windings 360 through 363 negative signals which are supplied to respective drive lines X1 through X4. The negative signal on each of these drive lines is depicted by the pulse 526 in FIG. 11. Therefore, it is readily seen that each of the gas cells (Y1, X1), (Y1, X2 X2), (Y1, X3), and (Y1, X4) receives a potential difference of a reduced magnitude. This magnitude is less than the level indicated by the dotted line 525 in FIG. 11. The duration of this signal is sufficient to change each of these cells to the binary zero state. The gas cells Y1, X1 and Y1, X3 are in the binary zero state, and no change of state takes place. However, the gas cells Y1, X2 and Y1, X4 undergo a change from the binary one state to the binary zero state. Thus it is seen how the gas cells associated with the Y1 drive line are erased by leaving each of them in the binary zero state after an erase operation.

Figure 13:
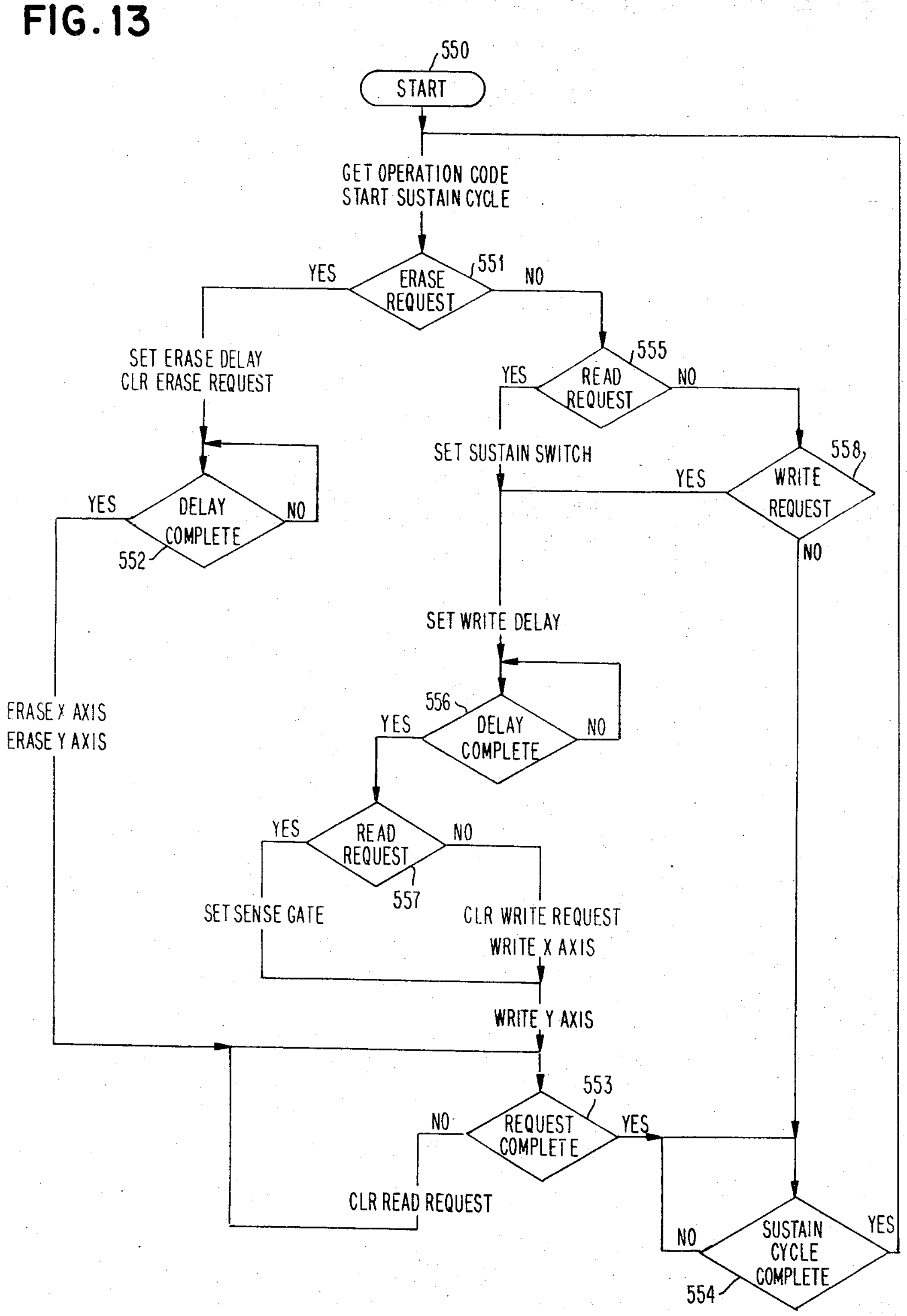
FIG. 13 is a flow chart which is helpful in describing the operation of the memory system in FIGS. 1 and 2.

Reference is made next to FIG. 13 which is a flow chart, and it is useful in summarizing the operation of the gas cell memory sytem according to this invention. The various blocks indicate decisions which are made, and actions taken are set forth between blocks. The start block 550 indicates the commencement of each operation cycle which is determined by the oscillator. The block 551 determines whether or not an erase request is made. If so, a delay takes place as indicated by the block 552, and upon termination of this delay, an erase operation takes place. After the erase operation is initiated as indicated by the block 553, the controller automatically returns to the state for carrying out a sustain operation for the remainder of the current oscillator cycle, and this is indicated by the block 554.

If an erase operation is not requested by the block 551, a read request is interrogated as indicated by the block 555. If a read request is made, a delay takes place as indicated by the block 556, and upon termination of this delay the read operation takes place as indicated by the block 557. Upon termination of this read operation, as indicated by the block 553, the controller returns to the block 554. If a read request is not made by the block 555, a write request is interrogated. If a write request is made, the program branches through the blocks 556,557 and 553 to the block 554, as explained above. If a write request is not made by the block 558, the program returns to the block 554. At the end of the oscillator cycle, the block 554 returns the controller to the start position.

While the invention has been particularly shown and described with reference to a preferred embodiment thereof, it will be understood by those skilled in the art that various changes in form and detail may be made therein without departing from the spirit and scope of the invention.

What is claimed is:

1. A method of operating a memory having a plurality of gas cells defined by coordinate intersections of a plurality of X lines and a plurality of Y lines disposed in an array, the method including the steps of:

1. applying continuously a sinusoidal signal to all Y lines, said sinusoidal signal having an amplitude greater than the sustain level at all times except during reading operations,
2. writing new information in said memory by applying a pulse to a selected Y line, applying pulses to selected X lines, said pulses being applied at a selected amplitude of said sinusoidal signal, thereby to set selected gas cells to the binary one state by exceeding the firing potential of such cells, and
3. performing a read operation by reducing the amplitude of said sinusoidal signal to a second amplitude below the sustain level and simultaneously applying a pulse to a selected Y line thereby to establish on only said selected Y line a signal level which exceeds the sustain level of the associated gas cells in the binary one state, and sensing simultaneously each X line for the presence of an electrical signal indicative of a binary one.

2. A gas cell memory including a plurality of gas cells defined by a plurality of X lines disposed on one side of said gas cells and a plurality of Y lines disposed on the opposite side of said gas cells, first means coupled to said X lines and said Y lines for reading or extracting electronically information stored in said gas cell memory, said first means further including:

second means for applying a pulse to a selected Y line, third means for applying a sinusoidal signal to all of said Y lines, the amplitude of said sinusoidal signal being less than the sustain level of said gas cells, and electrical sense means connected to said X lines, whereby (1) the potential difference established across the gas cells of the selected Y line by the sinusoidal signal and the pulse exceeds the sustain level, (2) gas cells in the binary zero state do not ignite, (3) gas cells in the binary one state ignite and couple a signal from the selected Y line to the associated X lines and (4) said sense means detects such signals on the X lines as representing binary ones and the absence of such signals on the X lines as representing binary zeros.

3. A memory system including a plurality of gas cells located at coordinate intersections defined by a plurality of X lines and a plurality of Y lines disposed in an array, first means to apply a continuous sinusoidal signal of a first amplitude or a second amplitude to said Y lines, second means to apply a pulse to a selected Y line and third means to apply a pulse to selected X lines whereby gas cells which receive pulse signals from said first and second means and signals of the first amplitude from said third means are fired and set to the binary one state, fourth means including sense amplifier means selectively connected to said X lines which responds to signals on the X lines to indicate the storage state of interrogated gas cells, and fifth means to perform a read operation by operating said fourth means to connect the sense amplifier means to said X lines, said first means to apply a sinusoidal signal of the second amplitude to all Y lines, and said second means for aplying a pulse to a selected Y line, whereby the combined signal on only said selected Y line exceeds the sustain potential of gas cells on the selected Y line in the binary one state and a signal transfer takes place from the selected Y line through such cells in the binary one state to the associated X lines which is detected by said sense amplifier means.

4. A memory system including a plurality of gas cells at coordinate intersections of a matrix defined by a plurality of X lines and a plurality of Y lines, first means for applying a pulse to selected X lines representative of a binary one, second means for applying a pulse to a selected Y line, third means for applying a continuous sinusoidal signal of a first amplitude or a second amplitude to said Y lines, sense amplifier means connected to said X lines which is operated to indicate the state of interrogated gas cells, control means connected to said first means, second means, third means and sense amplifier means, program control means coupled to supply combinations of control signals to said control means for manipulating said control means to operate said memory system, said control means responding to one combination of signals from said program control means to write information in said memory system, said control means including fourth means which operates said first means to apply pulses to said X lines representative of binary ones, said control means including fifth means which operates said second means to apply a pulse to a selected Y line, and said control means including sixth means which operates said third means to apply a sinusoidal signal of said first amplitude to said Y lines, whereby the potential difference exceeds the firing potential across gas cells where binary ones are to be stored, and said control means responding to another combination of signals from said program control means to read information from said memory system, said control means including seventh means which operates said sense amplifier means, said sixth means operating said third means to apply a sinusoidal signal of a second amplitude to said Y lines, and said fifth means operating said second means to apply a pulse to a selected Y line, whereby the combined signal exceeds the sustain potential of gas cells on the selected Y line in the binary one state and causes a signal transfer from the selected Y line through such cells in the binary one state to the associated X lines to operate said sense amplifier means to represent binary ones.

5. A gas cell memory including a plurality of gas cells defined by a plurality of X lines disposed on one side of said gas cells and a plurality of Y lines disposed on the opposite side of said gas cells, first means coupled to said X lines and said Y lines for reading or extracting electronically information stored in said gas cell memory, said first means further including:

second means for applying a first signal to a selected Y line, third means for applying a second signal having an amplitude less than the sustain level of said gas cells to all of said Y lines, and electrical sense means connected to said X lines, whereby (1) the potential difference established across the gas cells of said selected Y line by said second signal and said first signal exceeds said sustain level, (2) gas cells in the binary zero state do not ignite, (3) gas cells in the binary one state ignite and couple a signal from the selected Y line to the associated X lines, and (4) said sense means detects such signals on said X lines as representing binary ones and the absence of such signals on said X lines as representing binary zeros.

6. A method of operating a memory system composed of a plurality of gas cells located at coordinate intersections of a plurality of X and Y lines, the method including the steps of:

1. writing binary information into selected cells by exceeding the firing potential of such cells,
2. sustaining or regenerating the stored information by applying a first signal to all Y lines, said first signal having an initial amplitude greater than the sustain level at all times except during read operations, and
3. performing read operations by reducing the inital amplitude of said first signal to an amplitude below said sustain level, applying a second signal to a selected Y line, said second signal having an amplitude and phase whereby the signal level on only the selected Y line exceeds said sustain level, and sensing X lines for the presence of an electrical signal identifying said binary information.

7. The method of claim 6 including the further step of:

4. performing erase operations by applying a pulse to a selected Y line and a pulse to each X line at a specified amplitude of said first signal thereby to erase or remove any stored binary data.

8. A gas cell memory including a plurality of gas cells, a plurality of X lines, and a plurality of Y lines disposed in a matrix array, first means coupled to said X lines and said Y lines for reading or extracting electronically information stored in said gas cell memory, said first means further including:

second means for applying a pulse to a selected Y line, third means for applying a sinusoidal signal to said selected Y line, the amplitude of said sinusoidal signal being less than the sustain level of said gas cells, and fourth means connected to said X lines for detecting the presence or absence of electrical signals on each X line, whereby 1. the potential difference established across the gas cells of the selected Y line by the sinusoidal signal and the pulse exceeds the sustain level, 2. gas cells in the binary zero state do not ignite, 3. gas cell in the binary one state ignite and couple a signal from the selected Y line to the associated X lines, and 4. said fourth means detects such signals on the X lines as representing binary ones and the absence of such signals on the X lines as representing binary zeros.

9. The method of claim 8 including the further step of repeating step (1) continuously until step (2) or step (3) is initiated.

10. A method of operating a gas cell memory having X and Y lines disposed in an array, the method including the steps of:

1. applying continuously to the Y lines a sinusoidal signal of a first amplitude greater than the sustain level at all except during reading operations,
2. applying pulses to a selected Y line and to selected X lines at a selected amplitude of said sinusoidal signal for setting associated gas cells to the binary one state by exceeding the firing potential of such cells, and
3. applying to a selected Y line a pulse and to all Y lines a sinusoidal signal of a second amplitude below the sustain level, whereby the signal level on only the selected Y line exceeds the sustain level and simultaneously sensing all X lines for the presence of an electrical signal indicative of a binary one.

11. The method of claim 10 further including the step of repeating step (1) continuously until step (2) or step (3) is initiated.

12. A method of operating a memory system composed of a plurality of gas cells located at coordinate intersections of a plurality of X and Y lines, the method including the steps of:

1. writing information representing binary ones into selected cells by exceeding the firing potential of such cells,
2. sustaining or regenerating the stored information by applying continuously a sinusoidal signal to all Y lines, said sinusoidal signal having a first amplitude greater than the sustain level at all times except during read operations, and
3. performing read operations by reducing the amplitude of said sinusoidal signal to a second amplitude below the sustain level, applying a pulse to a selected Y line, said pulse having an amplitude and being applied at a selected phase of said sinusoidal signal whereby the signal level on only the selected Y line exceeds the sustain level, and simultaneously sensing each X line for the presence of an electrical signal representing a binary one.

13. The method of claim 12 including the further step of:

4. performing erase operations by applying a pulse to a selected Y line and a pulse to each X line at a given amplitude of said sinusoidal signal thereby to erase or remove any stored binary ones.

14. The method of claim 13 including the further step of performing sustain operations at all times when read, erase, or write operations are not performed.

15. A memory system including a plurality of gas cells, said memory system including a container of illuminable gas, a plurality of X lines disposed on one side of said container, and a plurality of Y lines disposed on the other side of said container, said Y lines extending orthogonally to said X lines, first means for applying pulse signals to said X lines representative of binary ones, second means for applying a pulse to a selected Y line, third means for applying a continuous sinusoidal signal to said Y lines, said sinusoidal signal having a first amplitude or a second amplitude, sense means coupled to said Y lines for electrically sensing the state of interrogated gas cells, control means connected to said first means, second means, third means, and sense means, program control means coupled to supply combinations of control signals to said control means for manipulating said control means to perform write, sustain, read, and erase operations of said memory system, said control means responding to one combination of signals from said program control means to write information in said memory system, said control means including fourth means which operates said third means to apply a sinusoidal signal of said first amplitude to said Y lines, said control means including fifth means which operates said first means to supply pulses at a given phase of said sinusoidal signal to said X lines representative of binary ones, and said control means including sixth means which operates said second means to apply a pulse at a given phase of said sinusoidal signal to a selected Y line whereby the potential difference exceeds the firing potential across gas cells associated with said selected Y line whereby binary ones are to be stored, said control means responding to a second combination of signals from said program control means to perform a read operation, said control means including seventh means which operates said sense means to indicate the state of interrogated gas cells, said control means operating said third means to apply a sinusoidal signal of said second amplitude to said Y lines, and said control means operating said second means to apply a pulse at a given phase of said sinusoidal signal to a selected Y line, whereby the combined signal on the selected Y line exceeds the sustain potential of associated gas cells in the binary one state and causes a signal transfer from the selected Y line through such cells in the binary one state to the associated X lines which operates said sense means to indicate binary ones, said control means responding to a third combination of control signals from said program control means to perform a sustain operation by operating said third means to apply a sinusoidal signal of said first amplitude to said Y lines whereby all gas cells in the binary one state are regenerated by being ignited, and said control means responding to a fourth combination of signals from said program control means to perform an erase operation, said control means operating said first means to apply a pulse to each X line, said control means operating said second means to apply a pulse to a selected Y line, said control means operating said third means to apply a sinusoidal signal of said first amplitude to said Y lines, the pulses from said first and second means being applied at a given phase of said sinusoidal signal whereby the combined signal applied for a given duration is sufficiently small to reduce to the zero state all gas cells associated with the selected Y line.

16. The apparatus of claim 15 wherein the control means includes further means which automatically operates the control means to perform sustain operations whenever said program control means does not operate said control means to perform read, write or erase operations.

17. The apparatus of claim 15 wherein said sense means includes an amplifier connected to each X line, and additional control means is coupled to each amplifier for disabling each amplifier at all times except when a read operation is performed.

* * * * *